United States Patent
Deville et al.

(10) Patent No.: US 12,043,788 B2
(45) Date of Patent: Jul. 23, 2024

(54) ENVIRONMENTALLY ACCEPTABLE WELLBORE STABILITY ADDITIVE

(71) Applicant: Halliburton Energy Services, Inc., Houston, TX (US)

(72) Inventors: Jay Deville, Houston, TX (US); Preston May, Houston, TX (US); Jeffrey J Miller, Houston, TX (US); Miren Aranzazu Castanares, Houston, TX (US); William W Shumway, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/327,603

(22) Filed: Jun. 1, 2023

(65) Prior Publication Data
US 2024/0010902 A1    Jan. 11, 2024

Related U.S. Application Data

(60) Provisional application No. 63/368,092, filed on Jul. 11, 2022.

(51) Int. Cl.
C09K 8/16      (2006.01)

(52) U.S. Cl.
CPC ............ C09K 8/16 (2013.01); *C09K 2208/10* (2013.01)

(58) Field of Classification Search
None
See application file for complete search history.

(56) References Cited

U.S. PATENT DOCUMENTS

| | | |
|---|---|---|
| 11,124,686 B2 | 9/2021 | Rojas et al. |
| 2012/0305254 A1* | 12/2012 | Chen ................. C09K 8/68 166/305.1 |
| 2014/0349894 A1 | 11/2014 | Quintero et al. |
| 2016/0160113 A1 | 6/2016 | Nguyen et al. |
| 2016/0362594 A1 | 12/2016 | Rojas et al. |
| 2020/0270504 A1 | 8/2020 | Khamatnurova et al. |

FOREIGN PATENT DOCUMENTS

CN     104694092 B     6/2015

OTHER PUBLICATIONS

OSPAR List of Substances Used and Discharged Offshore which Are Considered to Pose Little or No Risk to the Environment (PLONOR)—Update 2021.

* cited by examiner

*Primary Examiner* — Charles R Nold
(74) *Attorney, Agent, or Firm* — Sheri Higgins; Sheri Higgins Law

(57) ABSTRACT

A treatment fluid can include a base fluid and a stabilizing additive. The stabilizing additive can include a plurality of environmentally acceptable nanoparticles. The particle size distribution of the plurality of nanoparticles can be selected such that the nanoparticles stabilize a wellbore wall of a subterranean formation or form a filtercake to inhibit or prevent fluid loss into permeable areas of the formation. The plurality of nanoparticles can have a particle size distribution of a d10 value in the range of 20 to 45 nanometers, a d50 value in the range of 40 to 80 nanometers, and a d90 value in the range of 80 to 140 nanometers. The plurality of nanoparticles can also be coated with a polymeric shell. The treatment fluid can be used in an oil and gas operation.

13 Claims, 1 Drawing Sheet

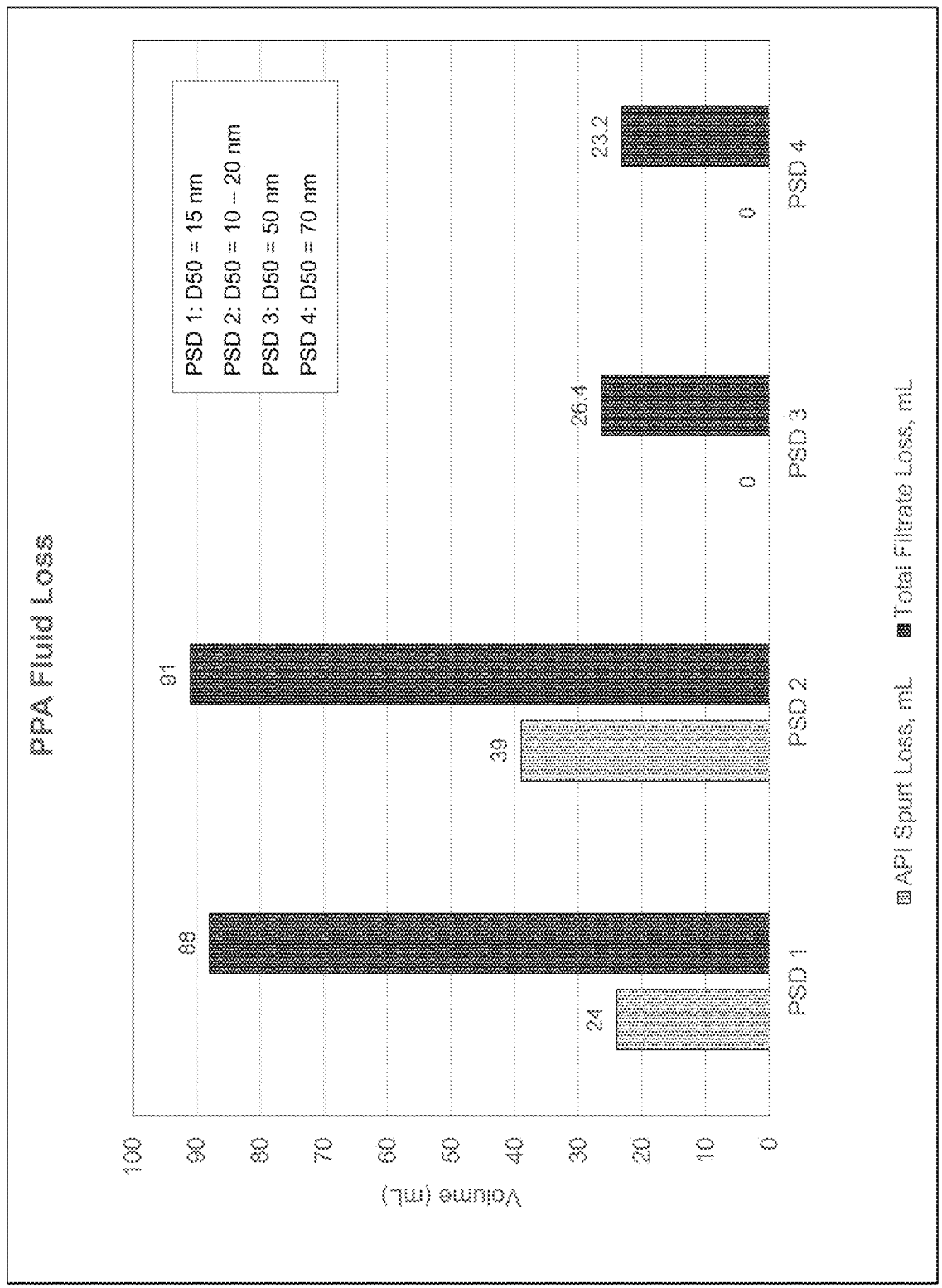

ENVIRONMENTALLY ACCEPTABLE WELLBORE STABILITY ADDITIVE

TECHNICAL FIELD

An additive can be used to help stabilize a wellbore. The additive can be environmentally acceptable nanoparticles.

BRIEF DESCRIPTION OF THE FIGURES

The features and advantages of certain embodiments will be more readily appreciated when considered in conjunction with the accompanying FIGURES. The figures are not to be construed as limiting any of the preferred embodiments.

FIG. 1 is a graph of fluid loss data showing different particle sizes d50 of a stabilizing additive according to certain embodiments.

DETAILED DESCRIPTION

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include but are not limited to the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

Oil or gas operations can be performed using a treatment fluid. The term "treatment fluid" refers to the specific composition of the fluid as it is being introduced into a well. The word "treatment" in the term "treatment fluid" does not necessarily imply any particular action by the fluid. Examples of treatment fluids include, but are not limited to, drilling fluids, spacer fluids, workover fluids, cement compositions, and stimulation fluids.

During drilling operations, a wellbore is formed using a drill bit. A drill string can be used to aid the drill bit in drilling through a subterranean formation to form the wellbore. The drill string can include a drilling pipe. A treatment fluid adapted for this purpose is referred to as a drilling fluid or drilling mud. The wellbore defines a wellbore wall that is the exposed portion of the subterranean formation where the wellbore was formed. The drilling fluid may be circulated downwardly through the drilling pipe and back up the annulus between the wellbore wall and the outside of the drilling pipe.

After a wellbore is formed, it may be desirable to perform a cementing operation. A treatment fluid called a spacer fluid can be introduced into the wellbore after the drilling fluid and before the cement composition. The spacer fluid can flush residual drilling fluid that may remain in parts of the wellbore or face of the subterranean formation to help ensure better bonding of the cement composition to the interface. Other types of oil or gas operations, for example, completion or workover operations can also be performed with a treatment fluid.

The wellbore wall and near-wellbore region of the subterranean formation can include permeable areas. Examples of permeable areas include cracks, natural fissures, fractures, vugs, interconnected pores, or induced fractures. Cracks, fissures, and fractures can generally be characterized as having a length greater than its diameter. Vugs and holes can be characterized as being any cavity having a variety of shapes and sizes. Porosity refers to the number of individual pores within an area of the subterranean formation. Permeability and all grammatical variations thereof, in this context, refers to the amount of interconnectivity between the individual pores that allows fluid to migrate or move between the interconnected pores. Permeable areas in the wall of the wellbore and near-wellbore region can vary and have dimensions ranging from 0.1 micrometers and as large as 50 micrometers or larger. As used herein, a "permeable area" means any area where fluid can flow into the subterranean formation via a wellbore and can be caused by—without limitation—cracks, fissures, fractures, cavities, and interconnected pores.

Some of the base fluid or filtrate of a treatment fluid can undesirably flow into the subterranean formation via the permeable areas instead of remaining in the wellbore and being circulated back up to the wellhead. This is known as fluid loss. In order to overcome the problems associated with fluid loss, a fluid loss control additive can be used. As the treatment fluid is placed into the well, the fluid loss control additive can eliminate or lessen the amount of liquid base fluid or filtrate entering the subterranean formation.

Fluid loss control additives can form a filtercake on the wall of the wellbore to reduce or stop fluid loss. A filtercake is the residue deposited on a permeable medium when a slurry, such as a drilling fluid, is forced against the medium under pressure. The filtrate is the liquid that passes through the medium, leaving the cake on the medium. In filtercake deposition, the slurry, that commonly includes materials including water, a gelling agent, calcium carbonate, weighting agents, and/or polymers, is introduced into the open-hole wellbore. The fluid flows into a desired portion of the well. The ingredients in the fluid form the filtercake. The filtercake can be used to bind fines, such as sand, together, and prevent fluid loss into the subterranean formation. The filtercake can help prevent fluid loss into the subterranean formation and can also help stabilize the wellbore by reinforcing the walls of the wellbore.

Some subterranean formations can be adversely affected by certain types of drilling fluids. One example of such a formation is a water-sensitive formation. When a drilling fluid contains water, and the water comes in contact with a water-sensitive formation, the water can adversely affect the subterranean formation. Some of the adverse effects can include swelling or sloughing of the subterranean formation, or gumbo formation.

An example of a water-sensitive formation is a shale formation. Shale formations are different from other types of formations, and there are even differences between individual shale formations. Typically, no two shale formations are the same. Therefore, finding ways to explore and develop shale gas from these formations is a challenge. Shale stabilizers can be added to the drilling fluid to inhibit these phenomena and to stabilize the shale from being affected by the drilling fluid. Reducing drilling fluid pressure invasion into the wall of a wellbore can be an important factor in maintaining wellbore stability. Maintaining sufficient wellbore pressure can stabilize shales to maintain the integrity of the wellbore. For example, when liquid from the drilling fluid invades the shale, the pressure in the pores may rise and the pressure differential between the drilling fluid column and the shale may fall. With the drop in differential pressure, the shale may no longer be supported and can break off and fall into the wellbore. Moreover, the invasion of water into the shale matrix can increase hydration or wetting of the partially dehydrated shale body causing it to soften and to lose its structural strength. Chemical reactivity of drilling fluid additives and the shale formation can also lead to instability.

Stabilizing additives can be added to drilling fluids. The stabilizing additive can help stabilize the wall of the wellbore via filtercake formation or in water-sensitive formations. However, environmental regulations can limit which ingredients can be used in oil or gas operations. Thus, there is a need for new stabilizing additives that can be used in drilling fluids that are more environmentally acceptable.

It has been discovered that a stabilizing additive can be used during wellbore drilling operations. The stabilizing additive can be environmentally acceptable. The OSPAR (Oslo/Paris Convention for the Protection of the Marine Environment of the North-East Atlantic) Commission has developed a pre-screening scheme for evaluating chemicals used in offshore oil and gas operations. According to OSPAR, a chemical used in offshore oil and gas operations should be substituted with an environmentally acceptable chemical if any of the following are met: a. it is on the OSPAR LCPA (List of Chemicals for Priority Action); b. it is on the OSPAR LSPC (List of Substances of Possible Concern); c. it is on Annex XIV to REACH (Regulation (EC) No 1907/2006 of the European Parliament and of the Council of 18 Dec. 2006 concerning the Registration, Evaluation, Authorisation and Restriction of Chemicals); d. it is covered by restrictions under Annex XVII to REACH; e. it is considered by the authority, to which the application has been made, to be of equivalent concern for the marine environment as the substances covered by the previous sub-paragraphs; f. it is inorganic and has a $LC_{50}$ or $EC_{50}$ less than 1 mg/l; g. it has an ultimate biodegradation (mineralization) of less than 20% in OECD 306, Marine BODIS or any other accepted marine protocols or less than 20% in 28 days in freshwater (OECD 301 and 310); h. half-life values derived from simulation tests submitted under REACH (EC 1907/2006) are greater than 60 and 180 days in marine water and sediment respectively (e.g. OECD 308, 309 conducted with marine water and sediment as appropriate); or i. it meets two of the following three criteria: (i) biodegradation: less than 60% in 28 days (OECD 306 or any other OSPAR-accepted marine protocol), or in the absence of valid results for such tests: less than 60% (OECD 301B, 301C, 301D, 301F, Freshwater BODIS); or less than 70% (OECD 301A, 301E); (ii) bioaccumulation: BCF>100 or log $P_{ow} \leq 3$ and molecular weight<700, or if the conclusion of a weight of evidence judgement under Appendix 3 of OSPAR Agreement 2008-5 is negative; or (iii) toxicity: $LC_{50}$<10 mg/l or $EC_{50}$<10 mg/l; if toxicity values <10 mg/l are derived from limit tests to fish, actual fish $LC_{50}$ data should be submitted. As used herein, any ingredient in a treatment fluid is considered to be "environmentally acceptable" if none of the above conditions are satisfied.

The stabilizing additive can also be inherently biodegradable. Stringent screening tests, conducted under aerobic conditions, in which a high concentration of a test substance (in the range of 2 to 100 mg/L) are used to measure biodegradation by non-specific parameters like Dissolved Organic Carbon (DOC), Biochemical Oxygen Demand (BOD), and carbon dioxide production. A positive result in a test for ready biodegradability can be considered as indicative of rapid and ultimate degradation in most environments including biological sewage treatment plants (ENV/JM/TG(2005)5/REV1. In freshwater tests, a pass level of 70% DOC removal (OECD 301 A and OECD 301 E); 60% theoretical carbon dioxide (ThCO2) (OECD 301 B); or 60% theoretical oxygen demand (ThOD) (OECD 301 C, OECD 301 D and OECD 301 F) in 28 days means the test substance can be considered to possess ready biodegradability.

Degradation of organic chemicals in seawater has generally been found to be slower than that in freshwater, activated sludge, or sewage effluent; therefore, a positive result of biodegradability in seawater test obtained during 28 days using the Closed Bottle Method (OECD 306, BODIS) or 60 days using the Shake Flask Method can be regarded as evidence of a chemical's potential for biodegradation in the marine environment (i.e., the chemical is regarded as readily biodegradable). A result of >20% ThOD or DOC removal is indicative of potential for primary biodegradation (referred to as inherently biodegradable) in the marine environment; whereas a result of >60% ThOD or 70% DOC removals is indicative of potential for ultimate biodegradation in the marine environment. The ultimate test to validate that the additive is inherently biodegradable is the 302 B-1992 Zahn-Wellens. A substance with a biodegradation rate of >20% is regarded as "inherently primary biodegradable."

A substance with a biodegradation rate of >70% is regarded as "inherently ultimate biodegradable."

The stabilizing additive can also be biocompatible. As used herein, "biocompatible" means the quality of not having toxic or harmful effects on biological systems. For example, if a drilling fluid is used in offshore drilling, then a release of the stabilizing additive into the water would not be harmful to aquatic life.

Environmental regulations can be different, for example, for onshore versus offshore operations and for different regions around the world. OSPAR, which is a cooperative agreement between multiple countries that protects the marine environment in the North-East Atlantic Ocean, has created a list of chemicals that the OSPAR commission considers to pose little or no risk to the environment—commonly called the PLONOR list. According to any of the embodiments, the stabilizing additive is made of substances that are on the PLONOR list or contains substances which are not subject to substitution according to the OSPAR prescreening scheme.

A treatment fluid can include a base fluid and a stabilizing additive.

Methods of treating a subterranean formation can include introducing the treatment fluid into the subterranean formation.

It is to be understood that the discussion of any of the embodiments regarding the treatment fluid or any ingredient in the drilling fluid is intended to apply to all of the method and composition embodiments without the need to repeat the various embodiments throughout. Any reference to the unit "gallons" means U.S. gallons.

The treatment fluid can be used in a variety of oil or gas operations. The treatment fluid can be, for example, a drilling fluid, a completion fluid, a spacer fluid, a workover fluid, a stimulation fluid, a packer fluid, an insulating fluid, a well-bore cleaning fluid, or a cement composition.

The treatment fluid can be a colloid, a heterogenous fluid, an emulsion, or an invert emulsion. The treatment fluid includes a base fluid. The base fluid can include dissolved materials or undissolved solids. The base fluid can include a hydrocarbon liquid, or an internal phase of the treatment fluid can include a hydrocarbon liquid. The hydrocarbon liquid can be selected from the group consisting of a fractional distillate of crude oil; a fatty derivative of an acid, an ester, an ether, an alcohol, an amine, an amide, an alkylated carbonate, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a fractional distillate of crude oil is diesel oil. The saturated hydrocarbon can be an alkane or paraffin. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin.

The treatment fluid can include water. The water can be selected from the group consisting of freshwater, seawater, brine, and any combination thereof in any proportion. The treatment fluid further includes a water-soluble salt. The water-soluble salt can be a monovalent salt or divalent salt. The water-soluble salt can be selected from the group consisting of sodium chloride, sodium bromide, sodium acetate, sodium formate, calcium chloride, calcium bromide, potassium chloride, potassium bromide, potassium acetate, potassium formate, magnesium chloride, zinc bromide, cesium formate, and any combination thereof. The treatment fluid can have a desired water phase salinity. Water phase salinity is a factor showing the activity level of salt in an oil-based drilling fluid and can indicate the concentration of dissolved salt in the fluid. The treatment fluid can have a water phase salinity in the range of 100 to 310,000 parts per million (ppm) or greater. According to any of the embodiments, the treatment fluid is a water-based drilling fluid.

The treatment fluid includes a stabilizing additive. The stabilizing additive can be environmentally acceptable. The stabilizing additive can be inherently or readily biodegradable. The stabilizing additive can be biocompatible. The treatment fluid can be used in offshore operations. The treatment fluid can be used in the North Sea. The ingredients of the treatment fluid can be selected such that the treatment fluid can be used in or discharged in the North Sea. The stabilizing additive can be on the PLONOR list.

The stabilizing additive can be added to the base fluid of the treatment fluid in neat form as a dry powder. The stabilizing additive can be added to the base fluid of the treatment fluid as a suspension. The suspension fluid can include water or a hydrocarbon liquid. According to any of the embodiments, if the stabilizing additive is in a suspension form, then the suspension fluid can be environmentally acceptable. By way of example, the suspension fluid can be an ester, such as an ester of fatty acids, with non-limiting examples including vegetable oils, animal (fish) oils, or seed oils. Examples of vegetable or seed oils include, but are not limited to, palm, soybean, tall, sunflower, olive, and others. The hydrocarbon suspension liquid can also be other substances that can be used in the North Sea, such as soy lecithin.

The stabilizing additive can be a nanocomposite and can be in the form of nanoparticles. As used herein, the term "nanocomposite" means a material made up of more than one material and has an average particle size at a largest dimension in the range of 1 to 200 nanometers (nm). As used herein, the term "nanoparticle" means a solid material having various geometric shapes with an average particle size at a largest dimension in the range of 1 to 200 nm. The stabilizing additive can include nano-sized inorganic materials including, but not limited to, amorphous or crystalline silica, barite, iron oxide, titanium oxide, calcium carbonate, and other materials. The inorganic material can be environmentally acceptable or biocompatible. The inorganic material can be selected from a list of materials on the PLONOR list of substances that can be used in the North Sea.

The stabilizing nanoparticles can have a variety of sizes and shapes. According to any of the embodiments, the nanoparticles have a desired particle size distribution. Particle-size distribution ("PSD") indicates the percentage of particles of a certain size (or in a certain size interval) in the whole. The PSD can also be a list of values or a mathematical function that defines the relative amount, typically by mass, of particles present according to size. As used herein, PSD is determined after weighing particles in a nanoparticle disc centrifuge analysis. Disc centrifuge measures particle size distributions using sedimentation. Particles settle in a fluid under a gravitational field according to Stokes' Law. Sedimentation velocity increases as the square of the particle diameter, so particles that differ in size by only a few percent settle at significantly different rates. In differential sedimentation, all the particles in a sample begin sedimentation as a thin band. If all the particles are of the same size, then they settle at the same speed and arrive at a detector beam as the thin band. The time needed to reach the detector is used to calculate the size of the particles. A broad distribution of sizes separates during sedimentation into a broad band, while a mixture of narrow sizes separates into separate and distinct narrow bands, each of which arrives at the detector at a different time. Unlike other measuring methods, such as dynamic light scattering or laser diffraction, which can provide inaccurate particle size values, disc centrifuge is capable of providing accurate results specific to nanoparticles having particle sizes less than 100 nanometers (nm) or even as small as 10 nm.

The PSD can be quantified into size classes or fractions, such as d10, d50, and d90 by plotting the PSD on a graph. D10 means 10% of the particles have a particle size that is less than this value. D50 means 50% of the particles have a particles size less than and 50% greater than this value. The d50 value is also known as the median particle size. D90 means 90% of the particles have a particles size less than this value.

The PSD of the stabilizing additive can be selected such that a test treatment fluid containing the stabilizing additive has a total filtrate loss using a permeability plugging apparatus with a disk having 12 micrometer pores at testing conditions of a pressure differential of 1,200 psi (8.3 megapascals) and a temperature of 180° F. (82.2° C.) less than 50 milliliters (mL) and an API spurt loss of less than 5 mL. The nanoparticles can have a particle size distribution of a d10 value in the range of 20 to 45 nm, a d50 value in the range of 40 to 80 nm, and a d90 value in the range of 80 to 140 nm. The nanoparticles can also have a particle size distribution of a d10 value in the range of 30 to 45 nm, a d50 value in the range of 50 to 80 nm, and a d90 value in the range of 80 to 130 nm.

The PSD of the nanoparticles can also be selected to impart desirable properties to the stabilizing additive. By way of a first example, a desirable property is filtercake formation. Accordingly, the PSD can be selected such that filtercake formation occurs during and after introduction of the treatment fluid into a subterranean formation. Filtercake formation can also reduce fluid loss into the subterranean formation, such as by providing a total filtrate of less than 50 mL and an API spurt loss of less than 5 mL in a permeability plugging apparatus. By way of another example, a desirable property is stabilization of water-sensitive formations. Accordingly, the PSD can be selected such that the wall of a wellbore of a water-sensitive formation is stabilized and shale sloughing, pressure migration through filtrate invasion, or other adverse effects are substantially reduced or preferably prevented. Filtercake formation can also aid in stabilizing the formation by reducing water penetration of water in a water-based treatment fluid into the formation and reacting with reactive components of the formation. True filtercake formation may not occur in water-sensitive subterranean formations. Therefore, the treatment fluid can reduce pressure transmission into these water-sensitive formations by sealing exposed surfaces of the formations.

The stabilizing additive can include a polymeric shell that wholly or partially surrounds the nanoparticles. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups or side chains connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer. As used herein, a "polymer" can include a cross-linked polymer. As used herein, a "cross link" or "cross linking" is a connection between two or more polymer molecules. A cross-link between two or more polymer molecules can be formed by a direct interaction between the polymer molecules, or conventionally, by using a cross-linking agent that reacts with the polymer molecules to link the polymer molecules. The polymer shell may or may not be covalently attached to the core. The inorganic core can be wholly or partially surrounded by the polymeric shell via a variety of processes.

A polymer has an average molecular weight, which is directly related to the average chain length of the polymer. For a copolymer, each of the monomers will be repeated a certain number of times (number of repeating units). The average molecular weight for a copolymer can be expressed as follows:

$$\text{Avg. molecular weight} = (M.W.m_1 * RU\ m_1) + (M.W.m_2 * RU\ m_2)\ldots$$

where $M.W.m_1$ is the molecular weight of the first monomer; $RU\ m_1$ is the number of repeating units of the first monomer; $M.W.m_2$ is the molecular weight of the second monomer; and $RU\ m_2$ is the number of repeating units of the second monomer. Of course, a terpolymer would include three monomers, a tetra polymer would include four monomers, and so on.

The polymer for the shell can be any polymer that is environmentally acceptable, readily or inherently biodegradable, biocompatible, or on the PLONOR list of substances that can be used in the North Sea. Non-limiting examples of polymers for the shell include polyesters, such as polylactic acid, polyethylene glycol, or polyglycolic acid; or polyamides, such as polymers of amino acids (i.e., polylysine) or proteins. Further examples include carrageenan, pectin, alginate, carboxymethylcellulose, guar, carboxymethyl hydroxypropyl guar, carboxymethyl hydroxyethyl guar, xanthan, diutan, carboxymethylhydroxylcellulose, starch, carboxymethyl starch, hydroxypropyl starch, scleroglucan, welan gum, rhamzan, succinoglycan, polyglycolide, polycaprolactone, polybutylene succinate, chitosan, chitin, galactomannan, B-glucans, xylan, mannans, polyvinyl alcohol (PVA), glucomannan, and inulin. Substances on the PLONOR list can also be used to make the polymeric shell including, but not limited to starch; cellulose; guar gum; hydroxyethyl cellulose; hydroxypropyl guar gum; lignin; lignite; polysaccharides containing glucose, mannose, and glucuronic acid units; sodium carboxymethylcellulose; sodium lignosulfonate; whey; xanthan gum; and hydroxypropylated cross-linked corn starch. The polymer for the shell can have a molecular weight greater than 10,000.

The polymeric shell can impart desirable properties to the stabilizing additive. Non-limiting examples of such desirable properties include increasing the thermal stability of the nanoparticles, preventing aggregation of the nanoparticles in the treatment fluid, stabilizing against contaminants in the treatment fluid or reservoir fluid by protecting the surface charge of the nanoparticles, and altering the wettability of the additive. The polymeric shell can also have tackifying properties. A tacky shell can cause the nanoparticles to better adhere to the wall of the wellbore and other constituents within the filter cake due to the stickiness of the stabilizing additive.

According to the embodiments where the nanoparticles further include the polymeric shell, the nanoparticles can be coated with the shell prior to use. According to another embodiment, the nanoparticles and the polymer can be introduced into the subterranean formation in the treatment fluid, and the polymer can coat (wholly or partially) the nanoparticles in situ within the wellbore during introduction of the treatment fluid into the subterranean formation. According to this other embodiment, the polymer is preferably solubilized or dispersed in the treatment fluid. The polymer can then interact downhole with the nanoparticles to coat and form the polymeric shell. The interaction between the polymer and the nanoparticles can be a non-chemical interaction, for example an electrostatic attraction.

The treatment fluid can have a total filtrate loss of less than 50 milliliters, less than 40 mL, or less than 30 mL using a particle plugging test with a disk having 12 micrometer pores at testing conditions of a pressure differential of 1,200 psi (8.3 megapascals) and a temperature of 180° F. (82.2° C.). The treatment fluid can also have an API spurt loss of less than 5 mL at the same testing conditions.

The stabilizing additive can be in a sufficient concentration such that the treatment fluid has a total filtrate loss of less than 50 mL, an API spurt loss of less than 5 mL, or both at the same testing conditions. The stabilizing additive can be in a concentration in the range of 1 to 35 pounds per barrel (lb/bbl) (3.9 to 135.3 kilograms per cubic meter (kg/m$^3$)).

A test treatment fluid can be used to determine the predicted performance of whether the treatment fluid provides the desired stabilization to the wellbore. It is to be understood that while the treatment fluid can contain other ingredients, it is the stabilizing additive that is primarily or wholly responsible for providing the requisite wellbore stabilization. For example, a "test treatment fluid" consisting essentially of, or consisting of, the base fluid and the stabilizing additive and in the same proportions as the treatment fluid can have the desirable properties to provide stabilization. It is also to be understood that any discussion related to a "test treatment fluid" is included for purposes of demonstrating that while the treatment fluid being introduced into a wellbore may contain other ingredients, it is the stabilizing additive that provides the desired wellbore stabilization. Therefore, while it may not be possible to perform a test in a wellbore for the specific treatment fluid being introduced, one can formulate a test treatment fluid to be tested in a laboratory to identify if the ingredients and concentration of the ingredients will provide the desired wellbore stabilization. The test treatment fluid can also include the other ingredients and in the same concentrations as in the treatment fluid.

A test treatment fluid consisting of the base fluid and the stabilizing additive having a particle size distribution of a d10 value in the range of 20 to 45 nm, a d50 value in the range of 40 to 80 nm, and a d90 value in the range of 80 to 140 nm can have a total filtrate loss of less than 50 milliliters using a particle plugging test with a disk having 12 micrometer pores at testing conditions of a pressure differential of 1,200 psi (8.3 megapascals) and a temperature of 180° F. (82.2° C.). The test treatment fluid can also have an API spurt loss of less than 5 mL at the same testing conditions.

The treatment fluid can also contain other ingredients. The other ingredients can be insoluble particles, for example: ground coal; petroleum coke; sized calcium carbonate; barite; ilmenite; hematite; manganese tetroxide; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material (such as ethylene vinyl acetate); a polytetrafluoroethylene material; ground nut shells, for example walnut, almond, or pecan; ground seed shells, for example sunflower seed shells; ground fruit pits; clay; silica; alumina; fumed carbon; carbon black; recycled carbon black; graphite; mica; titanium oxide; meta-silicate; calcium silicate; kaolin; talc; zirconia; boron; fly ash; a hollow glass microsphere; any composite particle thereof; and any combination thereof. The other ingredients can also be ingredients that chemically react to form a cementitious substance, for example, diatomaceous earth, and lime; a viscosifier; a shale stabilizer; a weighting agent; a pH buffer; an emulsifier; an emulsifier activator (e.g., lime); a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and any combination thereof. The other ingredients can also include conventional filtration control additives such as starch, modified crosslinked starches, carboxymethyl cellulose (CMC), polyanionic cellulose (PAC), etc. It has been discovered that conventional filtration control additives do not provide the same amount of wellbore stabilization as the stabilizing additive.

The treatment fluid can have desirable properties that can affect the pumpability and suspending capability of the fluid. The treatment fluid can have a plastic viscosity in the range of 10 to 90 centipoise (cP), or 20 to 70 cP at a temperature of 120° F. (48.9° C.). The plastic viscosity can also be in a range such that the treatment fluid is pumpable. The treatment fluid can have a yield point in the range of 2 to 60 pounds per 100 sq. ft. (lb/100 ft$^2$) (0.96 to 28.7 Pa) at a temperature of 120° F. (48.9° C.). The treatment fluid can also have a yield point in a range such that insoluble materials are suspended in the base fluid. The treatment fluid can have a 10 sec gel strength in the range of 1 to 30 lb/100 ft$^2$ (0.48 to 14.4 Pa) and a 10 min gel strength in the range of 1 to 50 lb/100 ft$^2$ (0.48 to 23.9 Pa) at a temperature of 120° F. (48.9° C.). The treatment fluid can have a density in the range of 6 to 20 pounds per gallon (ppg) (0.72 to 2.4 kilograms per liter (kg/L)).

The methods can include mixing the base fluid and the stabilizing additive together. According to any of the embodiments, the methods include the step of introducing the treatment fluid into a subterranean formation. The subterranean formation can be penetrated by a wellbore. The well can be an oil, gas, or water production well, a geothermal well, or an injection well. The well can be an onshore well or an offshore well. The well includes the wellbore. The subterranean formation can be part of a reservoir or adjacent to a reservoir. The step of introducing the treatment fluid can be a drilling fluid for the purpose of drilling the wellbore. The drilling fluid can be in a pumpable state before and during introduction into the subterranean formation. The well can include an annulus. The step of introducing the treatment fluid can include introducing the treatment fluid into a portion of the annulus. The treatment fluid can also be a spacer fluid, a completion fluid, a workover fluid, a stimulation fluid, a packer fluid, an insulating fluid, a wellbore cleaning fluid, or a cement composition. The methods can also include introducing one or more additional fluids before and/or after the step of introducing the treatment fluid.

An embodiment of the present disclosure is a treatment fluid comprising a base fluid; and a stabilizing additive, wherein the stabilizing additive comprises a plurality of nanoparticles and a polymeric shell that wholly or partially surrounds the plurality of nanoparticles. Optionally, the plurality of nanoparticles has a particle size distribution of a d10 value in a range of 20 to 45 nanometers, a d50 value in a range of 40 to 80 nanometers, and a d90 value in a range of 80 to 140 nanometers. Optionally, the stabilizing additive is environmentally acceptable. Optionally, the treatment fluid is a drilling fluid. Optionally, the base fluid comprises a hydrocarbon liquid, water, or a combination of a hydrocarbon liquid and water. Optionally, the plurality of nanoparticles are made from inorganic materials selected from the group consisting of amorphous or crystalline silica, barite, iron oxide, titanium oxide, calcium carbonate, and combinations thereof. Optionally, the plurality of nanoparticles has a particle size distribution of a d10 value in the range of 30 to 45 nm, a d50 value in the range of 50 to 80 nm, and a d90 value in the range of 80 to 130 nm. Optionally, the treatment fluid forms a filtercake on a wellbore wall of a subterranean formation or seals exposed surfaces of the subterranean formation. Optionally, the plurality of nanoparticles stabilizes a water-sensitive subterranean formation. Optionally, the polymer of the polymeric shell is selected from polyesters, polyamides, carrageenan, pectin, alginate, carboxymethylcellulose, guar, carboxymethyl hydroxypropyl guar, carboxymethyl hydroxyethyl guar, xanthan, diutan, carboxymethylhydroxylcellulose, carboxymethyl starch, hydroxypropyl starch, scleroglucan, welan gum, rhamzan, succinoglycan, polyglycolide, polycaprolactone, polybutylene succinate, chitosan, chitin, galactomannan, B-glucans, xylan, mannans, polyvinyl alcohol (PVA), inulin, starch, cellulose, guar gum, hydroxyethyl cellulose, hydroxypropyl guar gum, lignin, lignite, polysaccharides containing glucose, mannose, and glucuronic acid units, sodium carboxymethylcellulose, sodium lignosulfonate, whey, xanthan gum, or hydroxypropylated cross-linked corn starch. Optionally, the polymeric shell increases a thermal stability, alters the wettability, or prevents aggregation of the plurality of environmentally acceptable nanoparticles, or protects the plurality of environmentally acceptable nanoparticles against contaminants in the treatment fluid or a reservoir fluid. Optionally, the polymeric shell has tackifying properties. Optionally, the treatment fluid has a total filtrate loss of less than 50 milliliters using a particle plugging test with a disk having 12 micrometer pores at testing conditions of a pressure differential of 1,200 psi (8.3 megapascals) and a temperature of 180° F. (82.2° C.). Optionally, the treatment fluid has an API spurt loss of less than 5 milliliters using a particle plugging test with a disk having 12 micrometer pores at testing conditions of a pressure differential of 1,200 psi (8.3 megapascals) and a temperature of 180° F. (82.2° C.). Optionally, the stabilizing additive is in a concentration in the range of 1 to 35 pounds per barrel (3.9 to 135.3 kilograms per cubic meter). Optionally, the treatment fluid further comprises other additives selected from the group consisting of ground coal; petroleum coke; sized calcium carbonate; barite; ilmenite; hematite; manganese tetroxide; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material; a polytetrafluoroethylene material; ground nut shells; ground seed shells; ground fruit pits; clay; silica; alumina; fumed carbon; carbon black; recycled carbon black; graphite; mica; titanium oxide; meta-silicate; calcium silicate; kaolin; talc; zirconia; boron; fly ash; a hollow glass microsphere; ingredients that chemically react to form a cementitious substance selected from diatomaceous earth and lime; a viscosifier; a shale stabilizer; a weighting agent; a pH buffer; an emulsifier; an emulsifier activator; a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor; a mutual solvent; an oxidizer; a reducer; a friction reducer; a clay stabilizing agent; an oxygen scavenger; starch; modified crosslinked starches; carboxymethyl cellulose (CMC); polyanionic cellulose (PAC); and combinations thereof in any proportion. Optionally, the treatment fluid has a density in the range of 6 to 20 pounds per gallon (0.72 to 2.4 kilograms per liter).

Another embodiment of the present disclosure is a treatment fluid comprising a base fluid; and a stabilizing additive, wherein the stabilizing additive comprises a plurality of nanoparticles, wherein the plurality of nanoparticles has a particle size distribution of a d10 value in a range of 20 to 45 nanometers, a d50 value in a range of 40 to 80 nanometers, and a d90 value in a range of 80 to 140 nanometers. Optionally, the stabilizing additive is environmentally acceptable. Optionally, the treatment fluid is a drilling fluid. Optionally, the base fluid comprises a hydrocarbon liquid, water, or a combination of a hydrocarbon liquid and water. Optionally, the plurality of nanoparticles are made from inorganic materials selected from the group consisting of amorphous or crystalline silica, barite, iron oxide, titanium oxide, calcium carbonate, and combinations thereof. Optionally, the plurality of nanoparticles has a particle size distribution of a d10 value in the range of 30 to 45 nm, a d50 value in the range of 50 to 80 nm, and a d90 value in the range of 80 to 130 nm. Optionally, the treatment fluid forms a filtercake on a wellbore wall of a subterranean formation or seals exposed surfaces of the subterranean formation. Optionally, the plurality of nanoparticles stabilizes a water-sensitive subterranean formation. Optionally, the plurality of nanoparticles are wholly or partially coated with a polymeric shell. Optionally, the polymer of the polymeric shell is selected from polyesters, polyamides, carrageenan, pectin, alginate, carboxymethylcellulose, guar, carboxymethyl hydroxypropyl guar, carboxymethyl hydroxyethyl guar, xanthan, diutan, carboxymethylhydroxylcellulose, carboxymethyl starch, hydroxypropyl starch, scleroglucan, welan gum, rhamzan, succinoglycan, polyglycolide, polycaprolactone, polybutylene succinate, chitosan, chitin, galactomannan, B-glucans, xylan, mannans, polyvinyl alcohol (PVA), inulin, starch, cellulose, guar gum, hydroxyethyl cellulose, hydroxypropyl guar gum, lignin, lignite, polysaccharides containing glucose, mannose, and glucuronic acid units, sodium carboxymethylcellulose, sodium lignosulfonate, whey, xanthan gum, or hydroxypropylated cross-linked corn starch. Optionally, the polymeric shell increases a thermal stability, alters the wettability, or prevents aggregation of the plurality of environmentally acceptable nanoparticles, or protects the plurality of environmentally acceptable nanoparticles against contaminants in the treatment fluid or a reservoir fluid. Optionally, the polymeric shell has tackifying properties. Optionally, the treatment fluid has a total filtrate loss of less than 50 milliliters using a particle plugging test with a disk having 12 micrometer pores at testing conditions of a pressure differential of 1,200 psi (8.3 megapascals) and a temperature of 180° F. (82.2° C.). Optionally, the treatment fluid has an API spurt loss of less than 5 milliliters using a particle plugging test with a disk having 12 micrometer pores at testing conditions of a pressure differential of 1,200 psi (8.3 megapascals) and a temperature of 180° F. (82.2° C.). Optionally, the stabilizing additive is in a concentration in the range of 1 to 35 pounds per barrel (3.9 to 135.3 kilograms per cubic meter). Optionally, the treatment fluid further comprises other additives selected from the group consisting of ground coal; petroleum coke; sized calcium carbonate; barite; ilmenite; hematite; manganese tetroxide; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material; a polytetrafluoroethylene material; ground nut shells; ground seed shells; ground fruit pits; clay; silica; alumina; fumed carbon; carbon black; recycled carbon black; graphite; mica; titanium oxide; meta-silicate; calcium silicate; kaolin; talc; zirconia; boron; fly ash; a hollow glass microsphere; ingredients that chemically react to form a cementitious substance selected from diatomaceous earth and lime; a viscosifier; a shale stabilizer; a weighting agent; a pH buffer; an emulsifier; an emulsifier activator; a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor; a mutual solvent; an oxidizer; a reducer; a friction reducer; a clay stabilizing agent; an oxygen scavenger; starch; modified crosslinked starches; carboxymethyl cellulose (CMC); polyanionic cellulose (PAC); and combinations thereof in any proportion. Optionally, the treatment fluid has a density in the range of 6 to 20 pounds per gallon (0.72 to 2.4 kilograms per liter).

Another embodiment of the present disclosure is a method of treating a portion of a subterranean formation comprising introducing a treatment fluid into the subterranean formation, wherein the treatment fluid comprises: a base fluid; and a stabilizing additive, wherein the stabilizing additive comprises a plurality of nanoparticles, and wherein the plurality of nanoparticles has a particle size distribution of a d10 value in the range of 20 to 45 nanometers, a d50 value in the range of 40 to 80 nanometers, and a d90 value in the range of 80 to 140 nanometers; and causing or allowing the plurality of nanoparticles to stabilize and reduce fluid loss into permeable areas of the subterranean formation. Optionally, the stabilizing additive further comprises a polymeric shell that wholly or partially surrounds the plurality of nanoparticles. Optionally, the plurality of nanoparticles are coated with the polymeric shell prior to introduction of the treatment fluid into the subterranean formation. Optionally, the treatment fluid further comprises a polymer, and wherein the polymer wholly or partially coats the plurality of nanoparticles in situ during introduction of the treatment fluid into the subterranean formation. Optionally, the treatment fluid is a drilling fluid. Optionally, the base fluid comprises a hydrocarbon liquid, water, or a combination of a hydrocarbon liquid and water. Optionally, the plurality of nanoparticles are made from inorganic materials selected from the group consisting of amorphous or crystalline silica, barite, iron oxide, titanium oxide, calcium carbonate, and combinations thereof. Optionally, the plurality of nanoparticles has a particle size distribution of a d10 value in the range of 30 to 45 nm, a d50 value in the range of 50 to 80 nm, and a d90 value in the range of 80 to 130 nm. Optionally, the treatment fluid forms a filtercake on a wellbore wall of a subterranean formation or seals exposed surfaces of the subterranean formation. Optionally, the plurality of nanoparticles stabilizes a water-sensitive subterranean formation. Optionally, the polymer of the polymeric shell is selected from polyesters, polyamides, carrageenan, pectin, alginate, carboxymethylcellulose, guar, carboxymethyl hydroxypropyl guar, carboxymethyl hydroxyethyl guar, xanthan, diutan, carboxymethylhydroxylcellulose, carboxymethyl starch, hydroxypropyl starch, scleroglucan, welan gum, rhamzan, succinoglycan, polyglycolide, polycaprolactone, polybutylene succinate, chitosan, chitin, galactomannan, B-glucans, xylan, mannans, polyvinyl alcohol (PVA), inulin, starch, cellulose, guar gum, hydroxyethyl cellulose, hydroxypropyl guar gum, lignin, lignite, polysaccharides containing glucose, mannose, and glucuronic acid units, sodium carboxymethylcellulose, sodium lignosulfonate, whey, xanthan gum, or hydroxypropylated cross-linked corn starch. Optionally, the polymeric shell increases a thermal stability, alters the wettability, or prevents aggregation of the plurality of nanoparticles, or protects the plurality of nanoparticles against contaminants in the treatment fluid or a reservoir fluid. Optionally, the polymeric shell has tackifying properties. Optionally, the treatment fluid has a total filtrate loss of less than 50 milliliters using a particle plugging test with a disk having 12 micrometer pores at testing conditions of a pressure differential of 1,200 psi (8.3 megapascals) and a temperature of 180° F. (82.2° C.). Optionally, the treatment fluid has an API spurt loss of less than 5 milliliters using a particle plugging test with a disk having 12 micrometer pores at testing conditions of a pressure differential of 1,200 psi (8.3 megapascals) and a temperature of 180° F. (82.2° C.). Optionally, the stabilizing additive is in a concentration in the range of 1 to 35 pounds per barrel (3.9 to 135.3 kilograms per cubic meter). Optionally, the treatment fluid further comprises other additives selected from the group consisting of ground coal; petroleum coke; sized calcium carbonate; barite; ilmenite; hematite; manganese tetroxide; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material; a polytetrafluoroethylene material; ground nut shells; ground seed shells; ground fruit pits; clay; silica; alumina; fumed carbon; carbon black; recycled carbon black; graphite; mica; titanium oxide; meta-silicate; calcium silicate; kaolin; talc; zirconia; boron; fly ash; a hollow glass microsphere; ingredients that chemically react to form a cementitious substance selected from diatomaceous earth and lime; a viscosifier; a shale stabilizer; a weighting agent; a pH buffer; an emulsifier; an emulsifier activator; a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor; a mutual solvent; an oxidizer; a reducer; a friction reducer; a clay stabilizing agent; an oxygen scavenger; starch; modified crosslinked starches; carboxymethyl cellulose (CMC); polyanionic cellulose (PAC); and combinations thereof in any proportion. Optionally, the treatment fluid has a density in the range of 6 to 20 pounds per gallon (0.72 to 2.4 kilograms per liter). Optionally, the stabilizing additive is environmentally acceptable.

EXAMPLES

To facilitate a better understanding of the various embodiments, the following examples are given.

As used herein, "permeability plugging testing" of a test treatment fluid is tested using a permeability plugging apparatus developed and marketed by FANN® instruments. The Permeability Plugging Apparatus (PPA) is a high pressure, high temperature instrument designed to simulate downhole static filtration. The PPA operates at temperatures and pressures that represent well conditions, and the filtration medium is positioned above the sample fluid. The filter media is a ceramic disc. These discs closely simulate the structure of the formation, providing a more authentic representation of the filter cake that is actually being developed on the wall of the formation. Ceramic discs are available in several pore sizes.

Permeability plugging testing was performed at a specified temperature and pressure differential using API 13B-1 or 13B-2 testing procedures as follows. The jacket of the PPA is pre-heated to the specified testing temperature. The base fluid of the test fluid is mixed with any ingredients, such as a weighting agent and the stabilizing additive, in a low shear mixer at a high enough revolutions per minute (rpm) such that a vortex of approximately 0.5 inches (in.) is created for 5 minutes (min.). The PPA test cell is then pressurized to the specified testing pressure. The test fluid is then poured into a standard permeability plugging apparatus (PPA) test cell. An appropriately sized disk and the back pressure assembly is placed on the test cell. A timer set for 30 minutes is started. The filtrate valve is opened by turning it counterclockwise ½ turn to start the filtration. The cell pressure, indicated on the pump gauge, will drop initially. The pump is manually operated to maintain the desired test pressure. One minute after the valve is opened and the desired pressure is applied, the drain valve is opened on the back-pressure receiver and the filtrate is collected. The liquid is continued to be collected until the reservoir blows dry. The drain valve is then shut. Filtrate volume should be collected at additional time increments, including at 7.5 minutes, until the conclusion of the test at 30 minutes. Additional pressure is applied to the cell in order to maintain a constant test pressure and on the back pressure receiver for the duration of the test. The volume collected after 7.5 minutes is recorded as the 7.5-minute volume (V7.5). After 30 minutes have elapsed, the filtrate valve is closed, and all the filtrate from the backpressure receiver is drained into the graduated cylinder. The volume collected after 30 minutes is recorded as the "total filtrate" (V30). The API spurt loss is calculated as two times the 7.5-minute volume times 2 minus the total filtrate as shown in equation 1 below.

$$\text{API spurt loss} = 2*[(2*V7.5) - V30] \quad \text{Eq. 1}$$

Four test treatment fluids were prepared to evaluate different particle size distributions (PSD) of a stabilizing additive on fluid loss. The D50 value for each of the four different PSD of the stabilizing additive varied. The stabilizing additive was an environmentally acceptable additive made of silica. Table 1 lists the ingredients and concentrations as pounds per barrel (lb/bbl) and kilograms per cubic meter (kg/m$^3$) in the test treatment fluid.

TABLE 1

| Ingredient | Concentration (lb/bbl) | Concentration (kg/m$^3$) |
|---|---|---|
| Freshwater (barrels) | 0.83 | 0.83 |
| Xanthan gum (viscosifier) | 1.5 | 5.8 |
| Anionic cellulose (fluid loss control additive) | 2.5 | 9.7 |
| Caustic soda (alkalinity agent) | 0.3 | 1.2 |
| Shale inhibitor | 4 | 15.5 |
| Stabilizing additive | 5 | 19.3 |
| Bridging agent | 45 | 173.9 |
| Modified asphalt (fluid loss control additive) | 4 | 15.5 |
| Barite (weighting agent) | 170 | 657.1 |

FIG. 1 shows the data for API spurt loss and total filtrate loss in millimeters using a ceramic disk having a pore size of 12 micrometers (μm) at testing conditions of a temperature of 180° F. (82.2° C.) and a pressure differential of 1,200 pounds force per square inch (psi) (8.27 megapascals "MPa") for the four different fluids. As can be seen in FIG. 1, for fluids PSD 1 and PSD 2, having a D50 value less than or equal to 20 nanometers (nm), the spurt loss was greater than 20 mL and the total filtrate loss was greater than 85 mL. However, when the D50 was increased to greater than or equal to 50 nm as shown for PSD 3 and PSD 4, there was no spurt loss, and the total filtrate loss was less than 30 mL. Moreover, as can be seen, a D50 of 50 nm provided comparable total filtrate loss compared to a D50 of 70 nm, with 70 nm providing marginally better fluid loss control. This shows that the PSD and the median particle size (D50) of the stabilizing additive works very well above or equal to 50 nm and does not provide good fluid loss or stabilization at a D50 less than or equal to 20 nm. By extrapolating the data results, a D50 value of 40 nm may provide some acceptable fluid loss control, but it is likely a D50 value of 30 nm would not provide acceptable fluid loss control. Thus, there is a critical D50 range that can be used to provide acceptable fluid loss into a subterranean formation to stabilize the wall of a wellbore and allow exceptional filtercake formation.

Therefore, the various embodiments are well adapted to attain the ends and advantages mentioned as well as those that are inherent therein. The particular embodiments disclosed above are illustrative only, as the various embodiments may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more ingredients, etc., as the case may be, and do not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A treatment fluid comprising:
   a base fluid; and
   a stabilizing additive, wherein the stabilizing additive comprises a plurality of nanoparticles, wherein the plurality of nanoparticles has a particle size distribution of a d10 value in a range of 20 to 45 nanometers, a d50 value in a range of 40 to 80 nanometers, and a d90 value in a range of 80 to 140 nanometers.

2. The treatment fluid according to claim 1, wherein the treatment fluid is a drilling fluid.

3. The treatment fluid according to claim 1, wherein the plurality of nanoparticles are made from inorganic materials selected from the group consisting of amorphous or crystalline silica, barite, iron oxide, titanium oxide, calcium carbonate, and combinations thereof.

4. The treatment fluid according to claim 1, wherein the plurality of nanoparticles has a particle size distribution of a d10 value in a range of 30 to 45 nm, a d50 value in a range of 50 to 80 nm, and a d90 value in a range of 80 to 130 nm.

5. The treatment fluid according to claim 1, wherein the treatment fluid forms a filtercake on a wellbore wall of a subterranean formation or seals exposed surfaces of the subterranean formation.

6. The treatment fluid according to claim 1, wherein the plurality of nanoparticles stabilizes a water-sensitive subterranean formation.

7. The treatment fluid according to claim 1, wherein the plurality of nanoparticles are environmentally acceptable.

8. The treatment fluid according to claim 1, wherein the stabilizing additive further comprises a polymeric shell that wholly or partially surrounds the plurality of nanoparticles.

9. The treatment fluid according to claim 8, wherein the polymer of the polymeric shell is selected from polyesters, polyamides, carrageenan, pectin, alginate, carboxymethylcellulose, guar, carboxymethyl hydroxypropyl guar, carboxymethyl hydroxyethyl guar, xanthan, diutan, carboxymethylhydroxylcellulose, carboxymethyl starch, hydroxypropyl starch, scleroglucan, welan gum, rhamzan, succinoglycan, polyglycolide, polycaprolactone, polybutylene succinate, chitosan, chitin, galactomannan, B-glucans, xylan, mannans, polyvinyl alcohol (PVA), inulin, starch, cellulose, guar gum, hydroxyethyl cellulose, hydroxypropyl guar gum, lignin, lignite, polysaccharides containing glucose, mannose, and glucuronic acid units, sodium carboxymethylcellulose, sodium lignosulfonate, whey, xanthan gum, or hydroxypropylated cross-linked corn starch.

10. The treatment fluid according to claim 8, wherein the polymeric shell increases a thermal stability, alters the wettability, or prevents aggregation of the plurality of environmentally acceptable nanoparticles, or protects the plurality of environmentally acceptable nanoparticles against contaminants in the treatment fluid or a reservoir fluid.

11. The treatment fluid according to claim 8, wherein the polymeric shell has tackifying properties.

12. The treatment fluid according to claim 1, wherein the treatment fluid has a total filtrate loss of less than 50 milliliters using a particle plugging test with a disk having 12 micrometer pores at testing conditions of a pressure differential of 1,200 psi (8.3 megapascals) and a temperature of 180° F. (82.2° C.).

13. The treatment fluid according to claim 1, wherein the treatment fluid has an API spurt loss of less than 5 milliliters using a particle plugging test with a disk having 12 micrometer pores at testing conditions of a pressure differential of 1,200 psi (8.3 megapascals) and a temperature of 180° F. (82.2° C.).

* * * * *